US010922024B1

(12) United States Patent
Thomas

(10) Patent No.: US 10,922,024 B1
(45) Date of Patent: Feb. 16, 2021

(54) SELF-PROTECTION AGAINST SERIALIZATION INCOMPATIBILITIES

(71) Applicant: Amazon Technologies, Inc., Seattle, WA (US)

(72) Inventor: Peter L. Thomas, Ranson, WV (US)

(73) Assignee: Amazon Technologies, Inc., Seattle, WA (US)

(*) Notice: Subject to any disclaimer, the term of this patent is extended or adjusted under 35 U.S.C. 154(b) by 47 days.

(21) Appl. No.: 16/456,507

(22) Filed: Jun. 28, 2019

(51) Int. Cl.
*G06F 3/06* (2006.01)

(52) U.S. Cl.
CPC ............ *G06F 3/0659* (2013.01); *G06F 3/067* (2013.01); *G06F 3/0619* (2013.01)

(58) Field of Classification Search
CPC ..... H04L 43/04; H04L 67/125; H04L 67/025; H04L 67/2823; H04L 41/0866; H04L 41/0869; H04L 41/0873; G06F 3/0659; G06F 3/0619; G06F 3/067
See application file for complete search history.

(56) References Cited

U.S. PATENT DOCUMENTS

| | | | | |
|---|---|---|---|---|
| 5,560,018 A | * | 9/1996 | Macon, Jr. ............ | G06F 9/4812 710/260 |
| 6,298,353 B1 | * | 10/2001 | Apte ......................... | G06F 8/71 |
| 6,477,701 B1 | * | 11/2002 | Heistermann ........... | G06F 9/465 707/999.202 |
| 7,386,836 B2 | * | 6/2008 | Fox ....................... | G06F 9/4493 717/120 |
| 8,156,507 B2 | * | 4/2012 | Brjazovski .............. | G06F 9/542 719/319 |
| 9,483,284 B2 | * | 11/2016 | Pandit .................. | G06F 9/44552 |
| 2005/0289558 A1 | * | 12/2005 | Illowsky ............... | G06F 9/4843 719/318 |
| 2007/0162574 A1 | * | 7/2007 | Williamson ...... | H04L 29/08576 709/220 |
| 2009/0064206 A1 | * | 3/2009 | Olderdissen ............ | G06F 9/547 719/330 |
| 2009/0276795 A1 | * | 11/2009 | Dyer ..................... | G06F 9/4498 719/332 |
| 2009/0300190 A1 | * | 12/2009 | Williamson ...... | H04L 29/08576 709/227 |

(Continued)

*Primary Examiner* — Sargon N Nano
(74) *Attorney, Agent, or Firm* — Lee & Hayes, P.C.

(57) ABSTRACT

This disclosure describes performing a pre-activate check of reader nodes prior to deploying a new serialization format at writer nodes in a service provider network. Prior to activating a new serialization format on writer nodes, writer nodes query a metrics service within the service provider network for an aggregated serialization format version metric value for reader nodes, where the aggregated serialization format version metric value corresponds to a percentile of reader nodes that do not currently de-serialize objects using the newest deserialization format, e.g., the percentile of reader nodes that are not configured to recognize serialized objects serialized in the newest serialization format. The aggregated serialization format version metric values are based on a metric indicating the most recent serialization format version that a reader node is configured to de-serialize, which are emitted as reader nodes read serialized objects from a data store of the service provider network.

15 Claims, 8 Drawing Sheets

(56) References Cited

U.S. PATENT DOCUMENTS

| | | | | |
|---|---|---|---|---|
| 2009/0300225 A1* | 12/2009 | Williamson | ............ | H04L 67/14 710/8 |
| 2013/0117326 A1* | 5/2013 | De Smet | ............... | G06F 9/4488 707/798 |
| 2014/0157365 A1* | 6/2014 | Janakiraman | ......... | H04L 45/566 726/3 |

* cited by examiner

US 10,922,024 B1

SELF-PROTECTION AGAINST SERIALIZATION INCOMPATIBILITIES

BACKGROUND

Service providers offer cloud-based services via service provider networks to fulfill users' computing-service needs without the users having to invest in and maintain computing infrastructure required to implement the services. These service providers may provide network-based computing resources and functionality to implement various types of cloud-based services, such as scalable-storage services, computer-processing services, and so forth. In some examples, developers may utilize services offered by the service provider to run their applications using virtual servers (or "instances") provisioned on various configurations of hardware-based resources of a cloud-based service. These services may be provisioned in geographically disparate data centers in order to quickly and efficiently serve users of the applications that are hosted by the cloud-based service. Although these service provider networks provide significant customer benefits, management of the computing resources of these networks can prove difficult.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
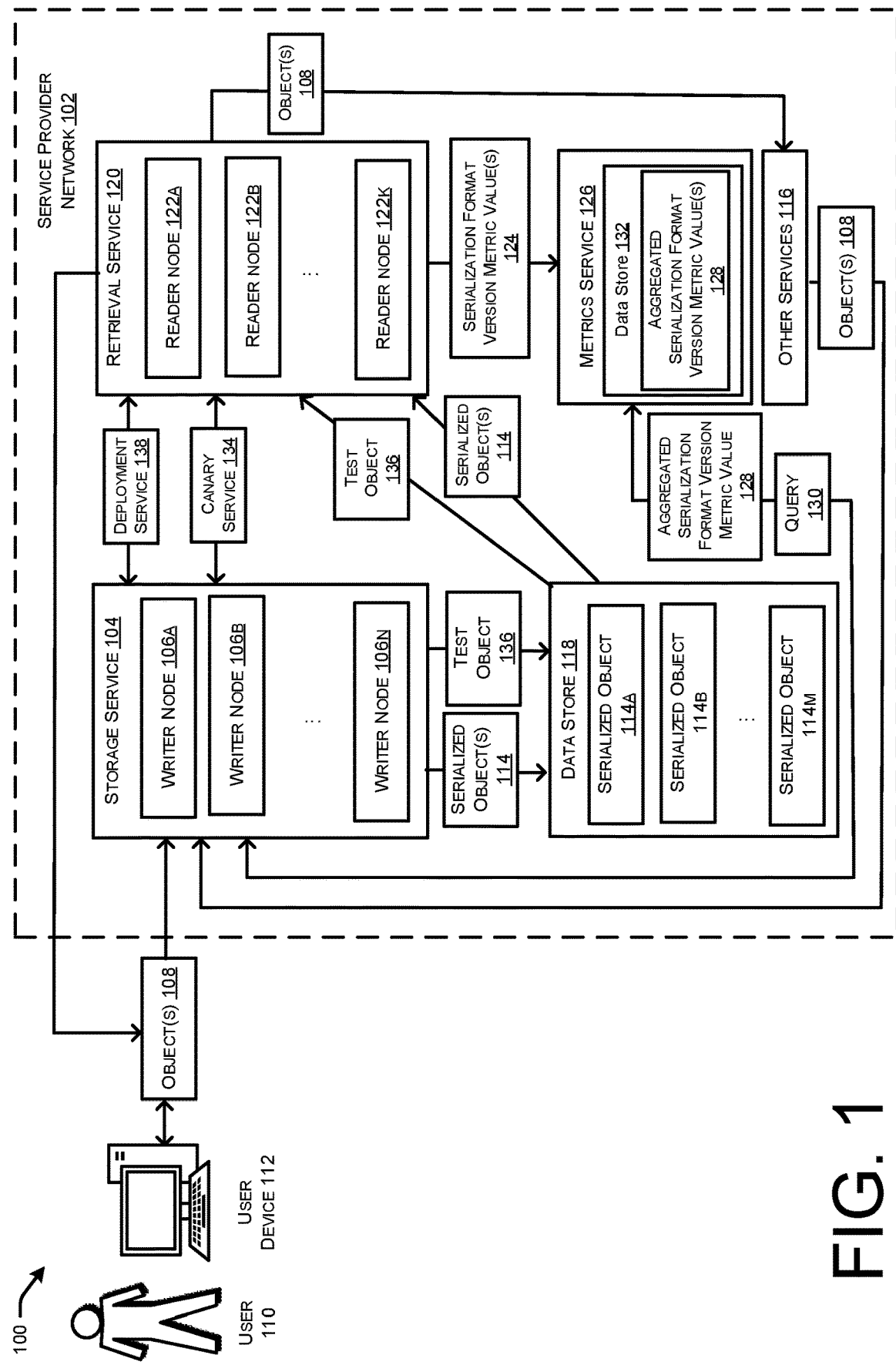
FIG. 1 illustrates a system-architecture diagram of an example environment that includes an example service provider network in which a pre-activate check may be performed for a new writer library serialization format version to be deployed in the service provider network.

This disclosure describes, at least in part, the ability to perform a pre-activate check of reader nodes prior to deploying a new serialization format at writer nodes. As introduced above, service provider networks provide an array of services to an array of different customers. When a customer utilizes a service of the service provider network, the service typically stores data on behalf of the customer by writing the data into a data store provided by the service provider network. When the data and information is to be written into the data store, a "writer" node serializes the data and information prior to writing the data and information to the data store. For example, the data and information may arrive at the service provider network in the form of objects written in a software such as, for example, Java, JavaScript Object Notation (JSON), Extensible Markup Language etc. The writer node serves as a serialization node and serializes the object and then writes the serialized object into the data store. When the serialized object in the data store is requested by the customer (or another service within the service provider network such as, for example, a processing service), a "reader" node of the service provider network reads the serialized object from the data store. The reader de-serializes the serialized object, and thus serves as a de-serialization node, to retrieve the object in its original form. The de-serialized object can then be provided to the customer (or another service within the service provider network) that requested the object.

Often, there are numerous formats for serializing the objects. The formats generally are changed or updated in response to changes within the various software languages of the objects. Thus, the various formats are in a time chronological order, e.g., v1, v2, v3, etc. The writer nodes generally only include the most current or recent format for serialization. However, in server provider networks, the data stores that store the serialized objects may store large amount of serialized objects that have been serialized over time. Thus, when a new serialization format is adopted, it is not practical to go back and reformat all of the serialized objects stored in the data store. Prior to deploying a new serialization format, the writer nodes and the reader nodes within the service provider network may need to be updated with the new format prior to implementing the new serialization format. Generally, deployment of the new serialization format is deployed to the writer nodes and reader nodes manually. When the format has been deployed, the writer nodes begin serializing in the new format and no longer serialize in any of the older formats.

When the reader nodes attempt to de-serialize serialized objects from the data store, the reader nodes continue to be configured to de-serialize according to older formats since the serialized objects stored within the data store have been serialized according to various formats. Thus, if a reader node attempts to de-serialize a serialized object with a serialization format that is not included on the reader node, an error occurs. For example, if too many of the reader nodes have not been updated with the most recent serialization format, and writer nodes have begun to serialize with the newer serialization version, major problems can arise within the service provider network causing delays in de-serializing of the serialized objects and thus, increasing the latency of providing the de-serialized objects to customers and/or other services within the service provider network. This can result in a degraded customer experience and satisfaction, an increase in wasted processing resources within the service provider network, and the like.

In order to address this and other problems, the techniques described below implement processes for ensuring that reader nodes of a service provider network have been updated to implement a particular version of a serialization format prior to allowing a write node to deploy the particular version of the serialization format. For example, the techniques may include that prior to activating a new serialization format on writer nodes, writer nodes query a metrics service within the service provider network for data indicating an aggregated serialization format version metric value for reader nodes, where the aggregated serialization format version metric value corresponds to a percentile of reader nodes that do not currently de-serialize objects using the new deserialization format, e.g., the percentile of reader nodes that are not configured to recognize serialized objects serialized in the new serialization format. The techniques described herein may decrease the latency of providing de-serialized objects to customers of and/or other services within the service provider network. This can result in an improved customer experience and customer satisfaction, a decrease in wasted processing resources within the service provider network, as well as additional advantages.

In particular, as reader nodes read serialized objects from a data store of the service provider network, the reader nodes emit or transmit data indicating a metric that indicates the highest or the most recent serialization format version that the reader node is configured to de-serialize. For example, if the most recent serialization format version is 6 and the reader node is only configured to de-serialize serialized objects that have been serialized according to versions 1-5, then the reader node will transmit a serialization format version metric value of 5 to the metrics service. As all the reader nodes in the service provider network continue to read and de-serialize serialized objects, the reader nodes will continue to transmit their serialization format version metric values. The metrics service will receive the serialization format version metric values and aggregate them into aggregated serialization format version metric values. When queried by a writer node, the metrics service can provide data indicating the worst or lowest percentile value, generally referred to as P0, of the aggregated serialization format version metric values with a value indicating the lowest serialization format version that one or more reader nodes are configured to use for deserialization. In this example, if P0 equals 5, this indicates that one or more reader nodes within the service provider network are not configured yet to de-serialize according to serialization format version 6.

Thus, in examples, when a new serialization format version is to be deployed across the service provider network, writer nodes within the service provider network, prior to serializing and writing objects to the data store, query the metrics service for data indicating the aggregated serialization format version metric P0. If P0 is not equal to, for example, 6, then the writer node will serialize the object to be written to the data store according to the P0 format value data returned from the metrics service, e.g., serialization format version 5. Once the metrics service begins returning the format version metric value data of P0 equals 6, then writer nodes will deploy the new serialization format version 6 for serializing and writing objects to the data store. While the writer nodes may discontinue using earlier versions of the serialization format, the reader nodes will maintain and continue to use older versions of the serialization format for de-serialization purposes since serialized objects within the data store may have been serialized and written therein using older serialization format versions in past.

In examples, writer nodes may periodically query the metrics service to "recheck" the serialization format version value of P0. For example, there may be situations where reader nodes within the service provider network have been inactivate for a long period of time. Thus, to ensure that the serialization format version metric P0 continues to be, for example, 6, writer nodes may recheck for the situation where an inactive reader node has come back online, e.g., become active. If the P0 value has changed from 6 to 5, this may indicate that one or more reader nodes have become active and are not configured to de-serialize serialized objects that have been serialized using serialization format version 6. In such a situation, a notification may be provided to indicate that one or more reader nodes are online and need to be updated. In some instances, the writer nodes may maintain earlier versions of serialization format version (e.g., serialization format version 5) and may, based on the change of P0 from 6 to 5, begin serializing objects using serialization format version 5 until P0 becomes 6 or greater. In these examples, the writer nodes may determine that the objects to be serialized may be serialized with full fidelity (e.g., may be serialized using the previous version such that each features of the object is supported).

Additionally, in examples, reader nodes may be contacted periodically when the reader node has not been used, e.g., active, for a long period of time. When such a reader node responds, the inactive reader node responds with a serialization format version metric value transmitted to the metric service. Thus, if the inactive reader node returns, for example, a serialization format version metric of 5, then P0 may drop back to 5, thereby indicating a need to update the inactive reader node.

In examples, the operator of the service provider network may set a threshold for the percentile of reader nodes that need to be updated with the newest serialization format version, e.g., 6, before allowing the writer nodes to deploy the new serialization format version. For example, the operator of the service provider network may indicate that instead of P0 equaling 6 prior to deployment of the new serialization format version 6, P10 may need to equal 6 before deployment of the serialization format version 6. In other words, 90 percent of the reader nodes need to be updated with serialization format version 6 prior to deploying serialization format 6 at the writer nodes. In some examples, the percentile of reader nodes (e.g., the threshold amount) may be based on a total cumulative value of serialization format version metric values transmitted to the metric service. For example, each serialization format version metric values transmitted to the metrics service may be aggregated for the values of P0, P10, and so forth. In other examples, the percentile of reader nodes may be based on a cumulative value of serialization format version metric values transmitted to the metrics service where only a single serialization format version metric value for each reader node is used. In these examples, each reader node may effectively receive "one vote" for determining the value of P0, P10, and so forth. In such examples, a most recent serialization format version metric value for each reader node may be used when aggregating the serialization format version metric values for the value of P0, P10, and so forth.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 that includes an example service provider network 102. The service provider 102 may comprise servers that do not require end-user knowledge of the physical location and configuration of the system that delivers the services. Common expressions associated with the service provider network 102 may include "on-demand computing," "software as a service (SaaS)," "cloud services," "data centers," and so forth. Services provided by the service provider network 102 may be distributed across one or more physical or virtual devices.

As may be seen in FIG. 1, the service provider network 102 includes a storage service 104 that includes a plurality of writer nodes 106a, 106b, . . . , 106n, referred to collectively herein as writer nodes 106 or singularly as writer node 106. The writer nodes 106 serialize objects 108a, 108b, . . . , 108m, referred to collectively herein as objects 122 or singularly as object 108, received from a user 110 via the user's user device 112 to provide serialized objects 114a, 114b, . . . , 114m, referred to collectively as serialized objects 114 or singularly as serialized object 114. In examples, the objects 108 may be received by the storage service 104 from other services 116 within the service provider network 102

The writer nodes 106 write the serialized objects 114 to a data store 118 within the service provider network 102. When the user 110, and/or another service of the other services 116, requests one or more serialized objects 114 from the data store 118, a retrieval service 120 within the service provider network 102 retrieves the requested serialized objects 114 from the data store 118. The retrieval service 120 comprises a plurality of reader nodes 122a, 122b, . . . , 122k, referred to collectively herein as reader nodes 122 or singularly as reader node 122, that retrieve the serialized objects 114 from the data store 118. When the reader nodes 122 retrieve the serialized objects 114 from the data store 118, the reader nodes 122 de-serialize the serialized objects 114 and provide the de-serialized objects as objects 108 to the user device 112 and/or the another service of the other services 116 that requested the objects.

When serializing objects 108, the writer nodes 106 utilize a serialization format version on the writer nodes 106. When the reader nodes 122 retrieve the serialized objects 114 from the data store 118, the reader nodes 122 check the first few bytes of a string of the serialized objects 114, e.g., a header, included within the serialized objects 114. The header identifies the serialization format version used to serialize objects 108 into serialized objects 114 and the reader nodes 122 utilize the appropriate deserialization format version to de-serialize the serialized objects 114 back into the objects 108.

Objects 108 to be stored within the data store 118 are usually configured in various formats of software or object languages, e.g., Java, JavaScript Object Notation (JSON), Extensible Markup Language, YAML Ain't Markup Language (YAML), etc. As the software language changes, e.g., to add a new field, the serialization format used by the writer nodes 106 may need to change. Thus, a new serialization format version may be deployed within the service provider network 102. However, as previously noted, if the reader nodes 122 do not include the appropriate de-serialization abilities for the serialization format version, when the reader nodes 122 check the header of serialized objects 114, the reader nodes 122 are unable to de-serialize the serialized objects 114 and thus, a deployment error occurs.

Accordingly, in examples, when reader nodes 122 retrieve serialized objects 114 from the data store 118, the reader nodes 122 transmit first data indicating a serialization format version metric value 124 to a metrics service 126 within the service provider network 102. The metrics service 126 gathers various metrics and data related to various performance aspects of the service provider network 102 and the services the service provider network 102 provides. The serialization format version metric values transmitted by the reader nodes 122 are stored in a data store 132 of the metrics service 126 and indicate the highest (generally newest) serialization format version that the reader node 122 is able to de-serialize. For example, if the highest serialization format is 6, e.g., the serialization format version that is most recent is version 6, then reader nodes 122 that are capable of de-serializing serialization format 6 emit a serialization format version metric value to the metric service 126 that has an integer value of 6. However, if a reader node 122 is only configured to de-serialize version 5 and earlier, then the reader node 122 transmits a serialization format version metric value having an integer value of 5. The metrics service 126 then aggregates the accumulated metric values to provide aggregated serialization version format metric values 128. An aggregated format metrics value P0 indicates the lowest serialization format version that one or more reader nodes are able to de-serialize. For example, if one or more reader nodes are only able to de-serialize serialization format 5, then P0 will have a value of 5.

Thus, in examples, when a new serialization format version, e.g., 6, is to be deployed, serialization format version 6 may be loaded onto the various writer nodes 106. Additionally, the appropriate deserialization software that can de-serialize serialized objects 114 that have been serialized using serialization format version 6 may be loaded onto the reader nodes 122. In an example, the reader nodes 122 are updated for serialization format version 6 first (along with reader portions of any nodes that may be configured to both write (serialize) and read (de-serialize)). Then the writer nodes 106 are updated for serialization format version 6 (along with writer portions of any nodes that may be configured to both write (serialize) and read (de-serialize)). However, this is a time-consuming process.

Thus, in order to avoid deployment errors, prior to serializing objects 108 using serialization format version 6, writer nodes 106 query 130 the metric service 126 for second data indicating an aggregated serialization format value 128 for a predetermined threshold. For example, if the predetermined threshold is 100%, then the aggregated serialization format value 128 for P0 (where P0 represents the value for percentile 0 and P100 represents the value for percentile 100) is queried. If P0 equals 6, thereby indicating that all reader nodes 122 are configured to de-serialize serialized objects 114 serialized using serialization format version 6, then the writer nodes 106 may begin serializing objects using serialization format version 6. Additionally, serialization format version 5 may, in examples, be removed from the writer nodes 106 so that the most current serialization format version, e.g., version 6, is used for serializing objects 108. However, since there are, for example, trillions of serialized objects 114 within the data store 118, older de-serialization software for de-serializing serialized objects 114 serialized in older serialization format versions remain on the reader nodes 122 so that serialized objects 114 that were serialized in older serialization formats can still be de-serialized. If, however, P0 equals, for example, 5, then the writer nodes 106 do not deploy serialization format version 6, but rather continue to serialize objects 108 using serialization format version 5.

In examples, a threshold value may be utilized by the service provider network 102 at which point the writer nodes 106 may deploy serialization format version 6. For example, it may be determined that a threshold value of 95 is acceptable for deploying serialization format version 6. Thus, in such examples, the writer nodes 106 may query the metrics service 126 for the P5 value, e.g., the aggregated serialization format metrics value that indicates the highest version, e.g., most recent version, that 5 percent of the reader nodes 122 are able to de-serialize. When P5 equals 6, this indicates that 95 percent of the reader nodes 122 are configured to de-serialize serialized objects 114 that have been serialized using serialization format version 6.

In some examples, the percentile of reader nodes (e.g., the threshold amount) may be based on a total cumulative value of serialization format version metric values transmitted to the metric service. For example, each serialization format version metric values transmitted to the metrics service may be aggregated for the values of P0, P10, and so forth (e.g., a highest version of the serialization format supported by a threshold amount of reader nodes 122 in the service provider network 102). In other examples, the percentile of reader nodes may be based on a cumulative value of serialization format version metric values transmitted to the metrics service where only a single serialization format version metric value for each reader node is used (e.g., a highest version of the serialization format indicated by a threshold amount of format version metric values 124, received at the metrics service 126 from reader nodes 122 in the service provider network 102). In these examples, each reader node may effectively receive "one vote" for determining the value of P0, P10, and so forth. In such examples, a most recent serialization format version metric value for each reader node may be used when aggregating the serialization format version metric values for the value of P0, P10, and so forth.

In order to provide the "one vote" for each reader node, the metrics service 126 may store a single format version metric value 124 for each reader node 122 based upon an identification (ID) of the reader node 122 (e.g., a host ID of the reader node 122). The metrics service 126 may update the format version metric value 124 for each reader node 122 if this value changes. Additionally, in examples, the metrics service 126 may only consider a single format version metric value 124 for each reader node 122 once during a predetermined time frame or "bucket." Thus, reader nodes 122 that are heavily used may not overly influence aggregated serialization format version metric value 128 when determining the value of P0, P5, and so forth. Accordingly, the values of P0, P10, and so forth may represent: (i) a highest version of the serialization format supported by a threshold amount of reader nodes 122 in the service provider network 102, or (ii) a highest version of the serialization format indicated by a threshold amount of format-value indications (e.g., format version metric values 124) received at the metrics service 126 from reader nodes 122 in the service provider network 102.

Thus, a pre-activate check may be performed by the writer nodes 106 prior to serializing objects 108 to prevent a writer library serialization format version from being deployed until a predetermined amount or percentage (threshold) of reader nodes 122 have been updated. This is achieved by the reader nodes 122 transmitting their corresponding serialization format version metric values 124 every time the reader nodes 122 read a serialized object 114, where the serialization format version metric 124 comprises a monotonically non-decreasing integer representing the highest version of the serialization format version that a reader node 122 supports. Over time, as the reader nodes 122 read serialized objects 114 from the data store 118, the reporting of the serialization format version metric values 124 by the reader nodes 122 to the metrics service 126 results in a body of metrics data representing the highest support version of each reader node 122. The minimum percentile value, P0, across all emitted serialization format version metric values 124, thus represents the highest serialization format version known to the oldest software operating for de-serialization purposes across the parallel distributed system of reader nodes 122. The pre-activate check performed by the writer nodes 106 may include querying the metrics system 126 for an aggregated serialization format value 128 using a look-back of a predetermined amount of time. For example, the look-back period may be five minutes, an hour, 12 hours, 24 hours, 48 hours, etc. and thus, the aggregated serialization format value 128 provided by the metrics service 126 will be provided as of the look-back period, e.g., the aggregated serialization format value 128 for P0 as of 5 minutes ago.

In some examples, a deploy service 138 may perform the pre-activate check before deploying a new writer library serialization format version. The deploy service 138 may query the metrics service 126 for an aggregated serialization format version metric value 128. If the P0 value, for example, does not correspond to the writer library serialization format version, then the deploy service 138 will not deploy or "activate" the writer library serialization format version. The new writer library serialization format version may remain on the reader nodes 106 and writer nodes 122 on which the new writer library serialization format version has been loaded but will remain inactive until the P0 correspond to the writer library serialization format version.

In examples, there are often reader nodes 122 that are minimally used or not even used at all for long periods of time. Thus, the serialization format version metric value 124 may not be emitted from such nodes frequently or even at all. Thus, in examples, such reader nodes 122 may be "checked" using "canary messages" transmitted by a canary service 134 periodically to such reader nodes 122 to stimulate such reader nodes 122 so that the reader nodes 122 may respond and transmit a serialization format version metric value 124 to the metrics service 126. The canary messages may involve the canary service 134 instructing a writer node 106 to write a test object 136 in the highest serialization format version to the data store 118. The data store 118 may provide a node ID indicating where the test object is written to the canary service 134 and the canary service 134 may stimulate an inactive reader node 122 to read and de-serialize the test object based upon the node ID. The inactive reader node 122 may then provide a serialization format version metric value 124 to the metrics service 126 and/or may provide an indication of an error (e.g., an indication that the inactivate reader node is unable to read and de-serialize the test object).

Additionally, in examples, when a reader node 122 that has not been active for a long period of time becomes active, if the reader node 122 reads a serialized object 114 from the data store 118 and is unable to de-serialize it, a deployment error occurs. The deployment error identifies the reader node 122 and indicates which scripts failed. Thus, a "fix-it ticket" may be generated so that the particular reader node 122 may be updated with the most recent serialization format version for de-serializing serialized objects 114 that have been serialized using the most recent, e.g., version 6, serialization format version.

Also, in examples, writer nodes 106 may periodically check the aggregated serialization format version metric value 128 from the metric service 126 for the desired threshold, e.g., P0 (100% threshold), of reader nodes 122. The periodic check may allow for the detection of an inactive reader node 122 that has recently become active. Since the P0 value returned by the metric service 126 may have changed from P0 equals 6 to P0 equals 5, this may indicate that a reader node 122 is now active but is not configured to de-serialize serialized objects 114 that have been serialized using serialization format version 6. In such a situation, a "fix-it" ticket may be generated so that an engineer, for example, can locate and update the reader node that has recently become active. In examples, the writer nodes 106 may maintain earlier versions of serialization format versions (e.g., serialization format version 5) and may, based on the change of P0 from 6 to 5, begin serializing objects 108 using serialization format version 5 until P0 is equal to or greater than 6 during a subsequent check of the aggregated serialization format version metric value 128 from the metric service 126 for the desired threshold of reader nodes 122. In such examples, the writer nodes 106 may determine that the objects 108 to be serialized may be serialized with full fidelity (e.g., may be serialized such that all features of the objects 108 are supported).

Figure 2:
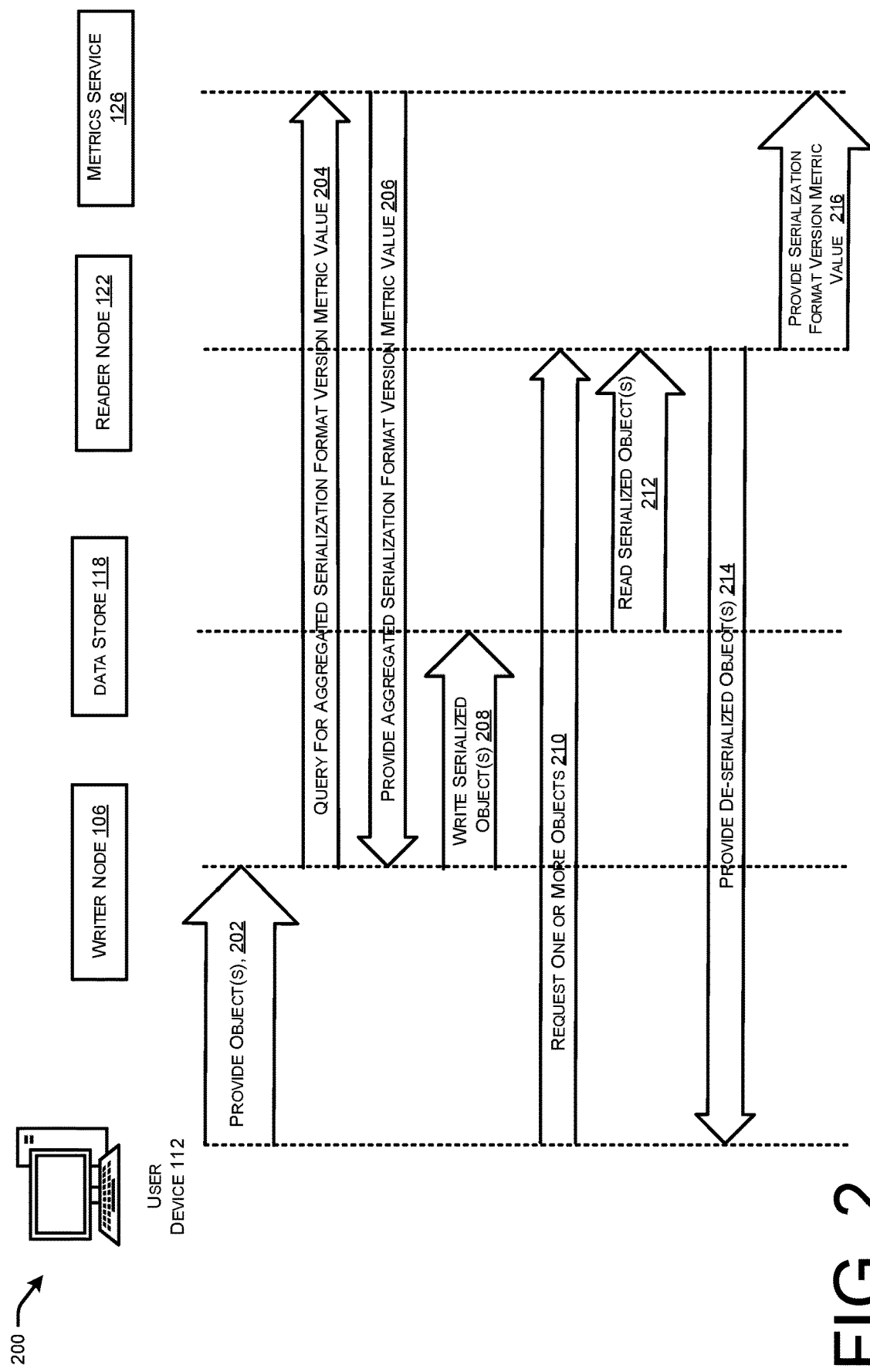
FIG. 2 illustrates an example sequence flow diagram for performing a pre-activate check performed by writer nodes for a new writer library serialization format version to be deployed in the service provider network.

FIG. 2 illustrates an example sequence flow diagram 200 for performing a pre-activate check performed by writer nodes 106 for a new writer library serialization format version to be deployed in service provider network 102. At 202, a user device 112 may provide one or more objects 108 to a writer node 106 for serialization and writing to the data store 118. In examples, the objects 108 may be provided by another service within the service provider network 102.

At 204, the writer node 106 queries the metrics service 126 for the aggregated serialization format version metric value for a predetermined threshold, e.g., 100%. The query may request the value for a predetermined look back period, e.g., five minutes, one hour, 12 hours, etc.

At 206, the metrics service 126 provides the aggregated serialization format version metric value 128 to the requesting writer node 106. The writer node 106 checks the returned aggregated serialization format version metric value 128. For example, if the desire is to have the entire network of reader node 122, e.g., the retrieval service 120, to have 100 percent compliance with the serialization format version 6 to be deployed, then the aggregated serialization format version metric value 128 requested and returned is the P0 value. If the P0 value equals 6, then at 208, the writer node 106 serializes objects 108 using serialization format version 6 and writes the serialized objects 114 to the data store 118. If, however, the P0 value equals 5, then at 208 the writer node 106 does not deploy serialization format version 6 and rather serializes the objects 108 utilizing serialization format version 5 and writes the serialized objects 114 to the data store 118.

At 210, the user device 112 (or some other service 116 within the service provider network 102) requests objects 108. At 212, a reader node 122 reads the requested serialized objects 114 from the data store 118. The reader node 122 reads the header of the serialized objects 114 to determine the serialization format version that was used to serialize the serialized objects 114. If the reader node 122 includes the serialization format version that was used to serialize the serialized objects 114, at 214 the reader node 122 de-serializes the serialized objects 114 and returns the de-serialized objects, e.g., objects 108, to the requesting user device 112 (or other service within the service provider network). However, if the reader node 122 is not configured to de-serialize serialized objects 114 serialized using, for example, serialization format version 6, the reader node 122 generates a deployment error.

As the reader node 122 reads the serialized objects 114, at 216 the reader node 122 transmits a serialization format version metric value 124 to the metrics service 126. As previously described, the metrics service 126 aggregates the serialization format version metric value 124 with other serialization format version metric values 124 to create the aggregated serialization format version metric values 128.

In examples, rather than the storage service 104 deploying and using a new client writer library utilizing a new serialization format, another element within the service provider network 102 may be updated and nodes within the service provider network 102 that consume the element may need to be updated. Thus, referring to FIG. 3, which schematically illustrates an example environment 300 that includes the example service provider network 102, an element 302 within the service provider network 102 is illustrated. For example, the element 302 may comprise an Application Programming Interface (API), referred to herein as API 302.

The service provider network 102 includes a plurality of producer nodes 304a, 304b, . . . , 304n, referred to herein collectively as producer nodes 304 or singularly as producer node 304. In an example, the API 302 may need to be updated from version 1 (v1) to version 2 (v2). Thus, the v2 of the API 302 may be loaded at the producer nodes 304. The producer nodes 304 may thus include v1 of the API 302 and v2 of the API 302.

The service provider network 102 includes a plurality of consumer nodes 306a, 306b, . . . , 306m, referred to herein collectively as consumer nodes 306 or singularly as consumer node 306, within the service provider network consume, e.g., call, the API 302 at the producer nodes 304. When the consumer nodes 306 call the API 302, the consumer nodes 306 transmit first data indicating corresponding API version metric values 308a, 308, . . . , 308m to the metrics service 126, which the metrics service stores in the data store 132. Thus, the metrics service accumulates the various API version metric values 308 and aggregates them. Prior to deploying the new version of the API, e.g., API v2, when a consumer node 306 calls the API 302 at the producer node 304, the producer node 304, queries 312 the metrics service 126 for second data indicating an aggregated API version metric value 310. If the P0 aggregated API version metric value 310 returned to the requesting producer node 304 is equal to 2, then the producer node realizes that all the consumer nodes 306 within the service provider network 102 are configured to utilize the API v2. Thus, the producer node 304 may deploy API v2. However, if P0 equals 1, then the producer node 304 continues to utilize API v1 when a consumer node 306 calls the API 302.

As previously described, a look back period for the API version metric value 308 may be five minutes, one hour, 12 hours, 24 hours, etc. Additionally, as previously described, consumer nodes 306 may be periodically checked if they have been inactive or minimally used for long periods of time in order for them to transmit an API version metric value 308 to the metrics service 126. Additionally, the consumer nodes 304 may periodically "recheck" the P0 API version metric value 308 at the metrics service 126 in order to ensure that a new consumer node 306 has not become active that is not configured to utilize API v2. Additionally, as previously described, rather than P0, a predetermined percentage (threshold), e.g., 95 percent, may be utilized for deployment of the new API v2. Thus, if a P5 API version metric value 308 is returned by the metrics service 126 having a value of 2, then the producer nodes 304 may deploy API v2.

Figure 3:
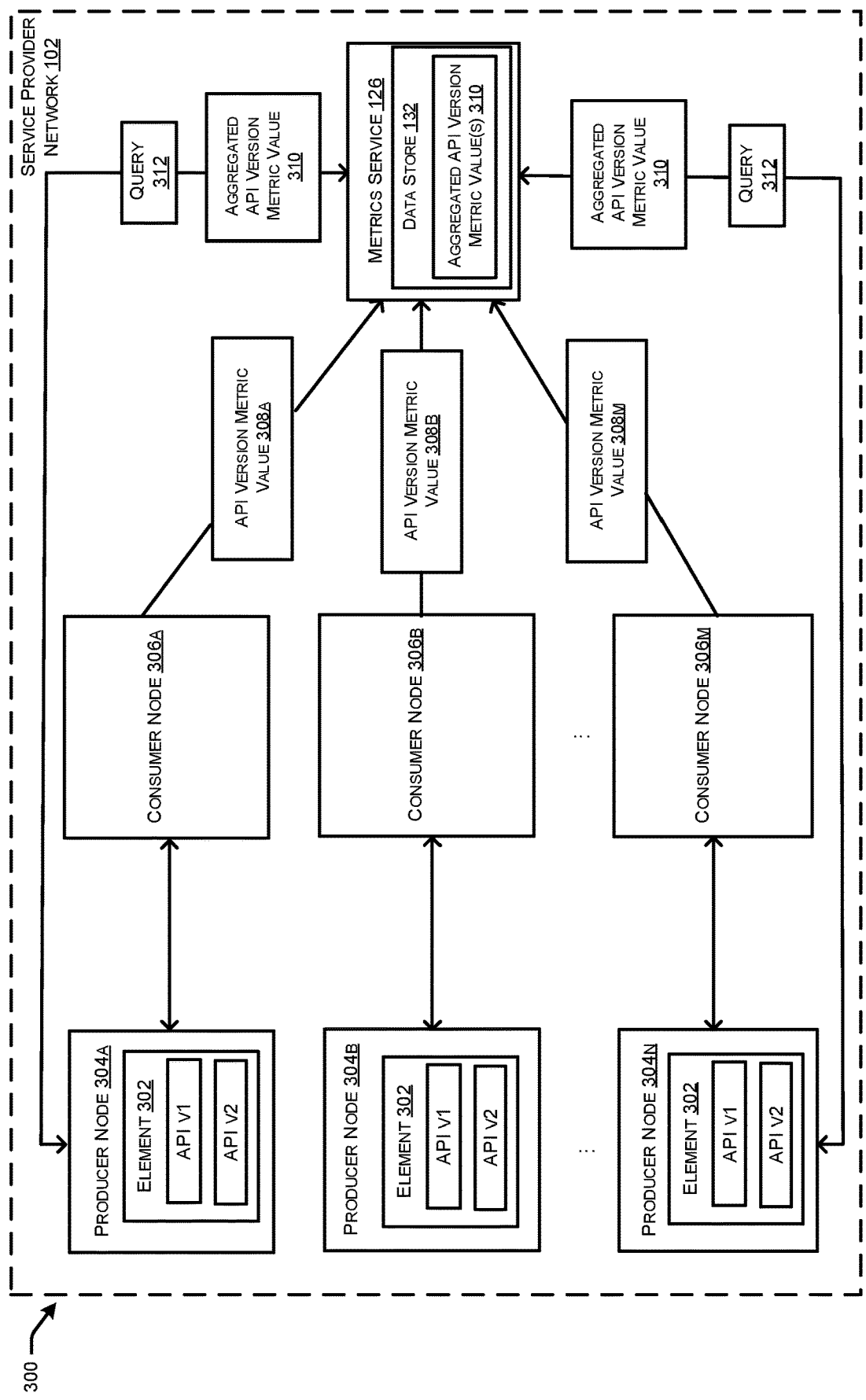
FIG. 3 schematically illustrates another example environment that includes the service provider network in which a pre-activate check may be performed for a new element version to be deployed in the service provider network.
Figure 4:
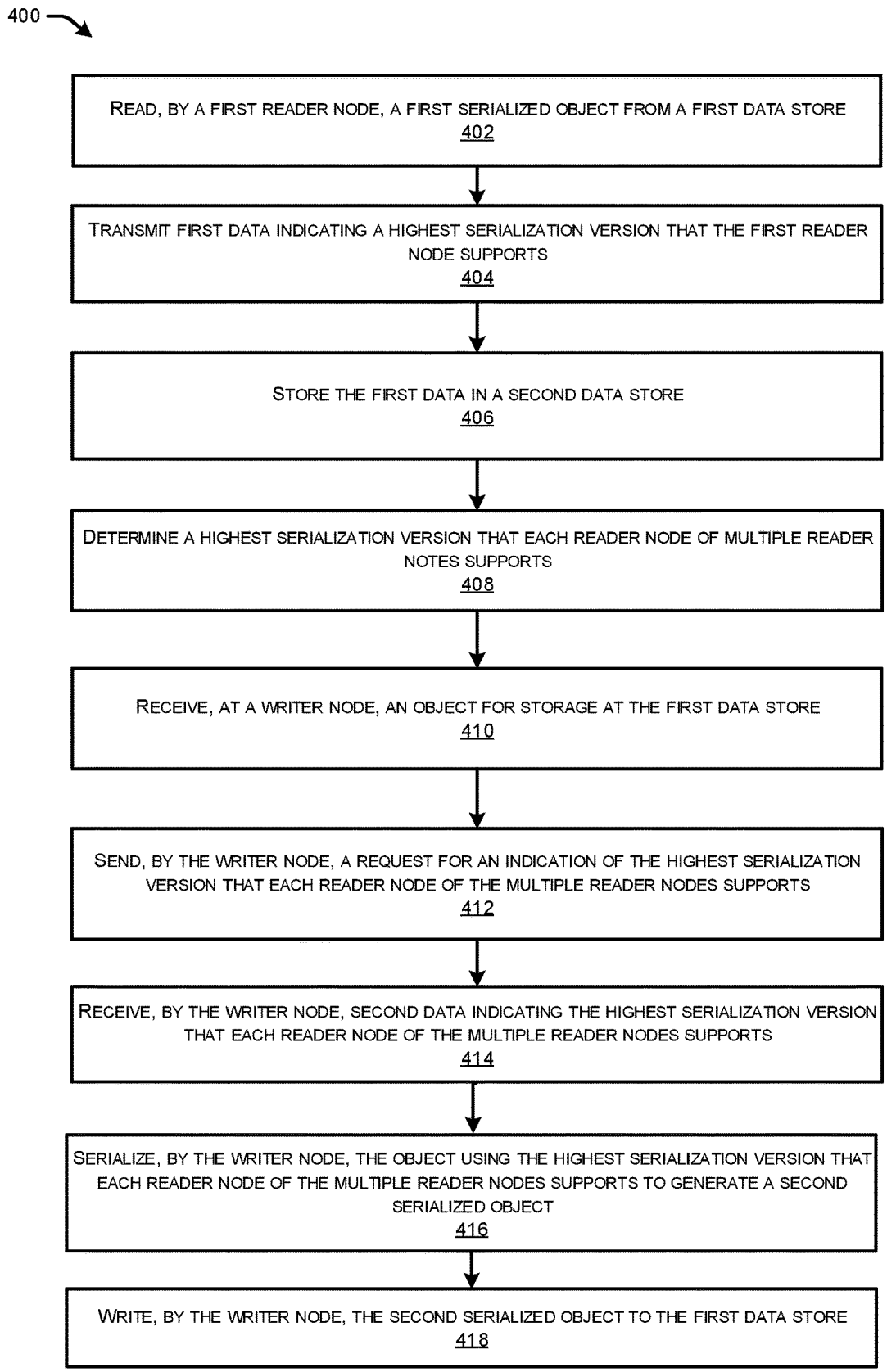
FIG. 4 illustrates a flow diagram of an example method for performing a pre-activate check for a new writer library serialization format version to be deployed in the service provider network.

FIG. 4 illustrates a flow diagram of an example method 500 that illustrates aspects of the functions performed at least partly by the service provider network 102 as described in FIGS. 1-3. The logical operations described herein with respect to FIG. 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 4, and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 illustrates a flow diagram of an example method for performing a pre-activate check for a new writer library serialization format version to be deployed in a service provider network, e.g., service provider network 102.

At 402, a first serialized object is read from a data store by a first reader node of multiple reader nodes. For example, the service provider network 102 comprises a plurality of reader nodes, e.g., reader nodes 122. The first serialized object, e.g. serialized object 114, may be read by a reader node 122 from the data store 118 within the service provider network 102.

At 404, first data indicating a highest serialization version that the first reader node supports is transmitted by the first reader node to a metrics service. For example, the reader node 122 may transmit first data that indicates the serialization format version metric value 124 for the first reader node 122 to the metrics service, e.g., the metrics service 126, within the service provider network 102. The serialization format version metric value 124 may indicate the highest serialization format version, e.g., version 5 out of 6 versions, for which the reader node 122 is configured to de-serialize the serialized object 114.

At 406, the metrics service stores the first data in a second data store. For example, the metrics service 126 may store the first data in data store 132.

At 408, the metrics service determines a highest serialization version that each reader node of the multiple reader notes supports. For example, the metrics service 126 may aggregate the serialization format version metric values 124 received from the multiple reader nodes 122 and generate an aggregated serialization format version metric value 128 that indicates a highest serialization version that each reader node 122 of the multiple reader notes 122 supports.

At 410, a writer node receives an object for storage at the first data store. For example, a writer node 106 may receive an object 108 for writing to the data store 118.

At 412, the writer node sends to the metrics service a request for an indication of the highest serialization version that each reader node of the multiple reader nodes supports. For example, the writer node 106 may send a request to the metrics service 126 for an aggregated serialization format version metric value 128 that indicates a highest serialization version that each reader node 122 of the multiple reader notes 122 supports.

At 414, the writer node receives from the metrics service second data indicating the highest serialization version that each reader node of the multiple reader nodes supports. For example, the second data may represent an aggregated serialization format version metric value 128 that indicates a highest serialization version that each reader node 122 of the multiple reader notes 122 supports.

At 416, the writer node serializes the object using the highest serialization version that each reader node of the multiple reader nodes supports to generate a second serialized object. For example, the writer node 106 may serialize the object 108 using the highest serialization version that each reader node 122 of the multiple reader notes 122 supports to generate a second serialized object 114.

At 418, the writer node may write the second serialized object to the first data store. For example, the writer node 106 writes the serialized object 114 to the data store 118.

Figure 5:
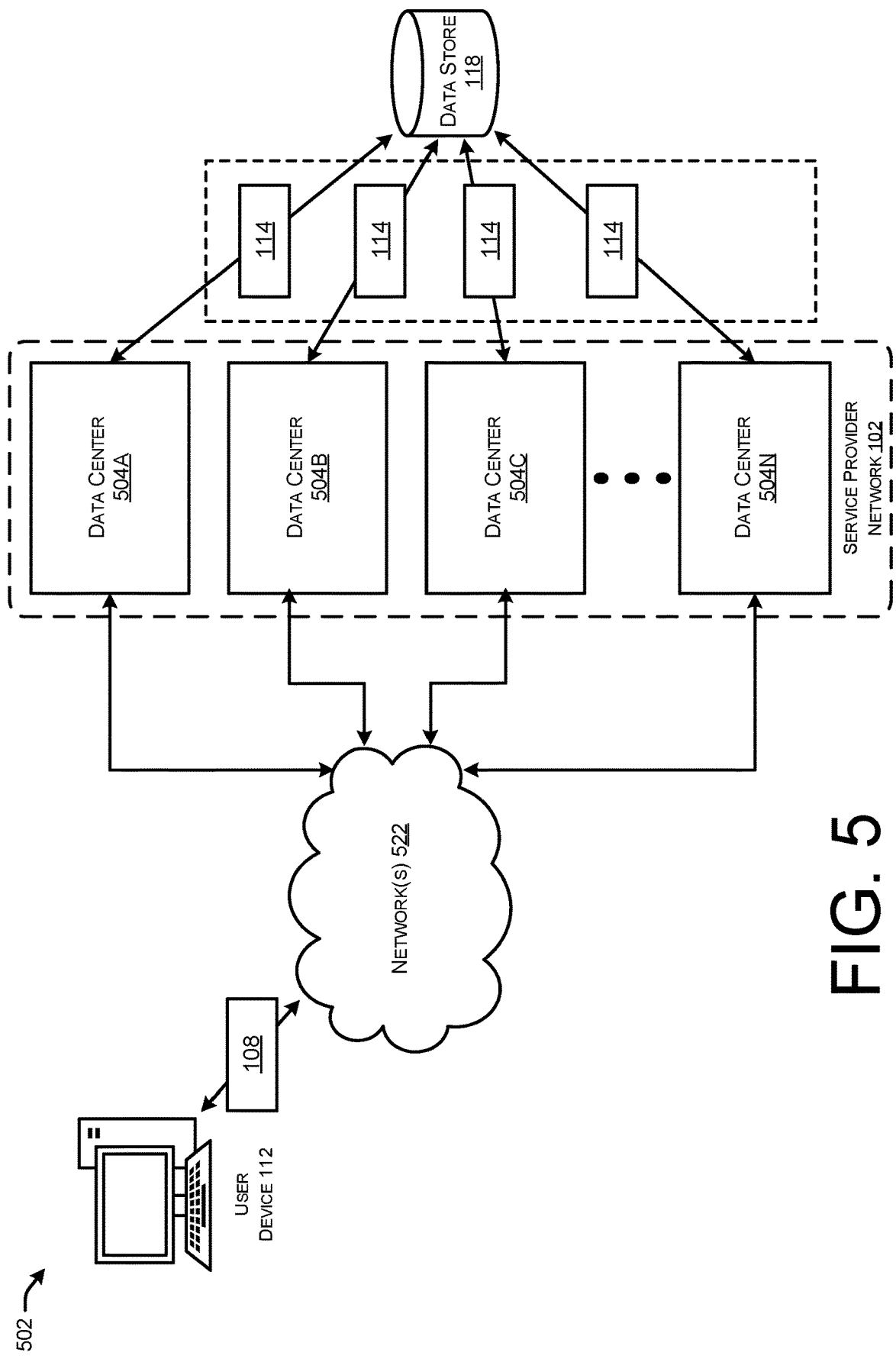
FIG. 5 is a system and network diagram that shows an illustrative operating environment that includes a service provider network that can be configured to implement aspects of the functionality described herein.

FIG. 5 is a system and network diagram that shows one illustrative operating environment 502 for the configurations disclosed herein that includes a service provider network 102 that can be configured to perform the techniques disclosed herein. The service provider network 102 can provide computing resources, like VM instances and storage, on a permanent or an as-needed basis. Among other types of functionality, the computing resources provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 504A-504N (which might be referred to herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 can also be located in geographically disparate locations. One illustrative embodiment for a data center 504 that can be utilized to implement the technologies disclosed herein will be described below with regard to FIG. 6.

The data centers 504 may be configured in different arrangements depending on the service provider network 102. For example, one or more data centers 504 may be included in or otherwise make-up an availability zone. Further, one or more availability zones may make-up or be included in a region. Thus, the service provider network 102 may comprise one or more availability zones, one or more regions, and so forth. The regions may be based on geographic areas, such as being located within a predetermined geographic perimeter.

The customers and other users 110 of the service provider network 102 may access the computing resources provided by the service provider network 102 over any wired and/or wireless network(s) 522, which can be a wide area communication network ("WAN"), such as the Internet, an intranet or an Internet service provider ("ISP") network or a combination of such networks. For example, and without limitation, a user device 112 operated by a customer or other user 110 of the cloud-based service 102 may be utilized to access the service provider network 102 by way of the network(s) 522. It should be appreciated that a local-area network ("LAN"), the Internet, or any other networking topology known in the art that connects the data centers 504 to remote customers and other users can be utilized. It should also be appreciated that combinations of such networks can also be utilized.

As shown in FIG. 5, each of the data centers 504 may include computing devices that included software, such as applications that receive and transmit objects 108 and serialized objects 114. For instance, the computing devices included in the data centers 504 may include software components which transmit, retrieve, receive, or otherwise provide or obtain, serialize and/or de-serialize the objects 108 and/or serialized objects 114 from the data store 118. For example, the data centers 504 may include or store the data store 118, which includes the serialized objects 114.

Figure 6:
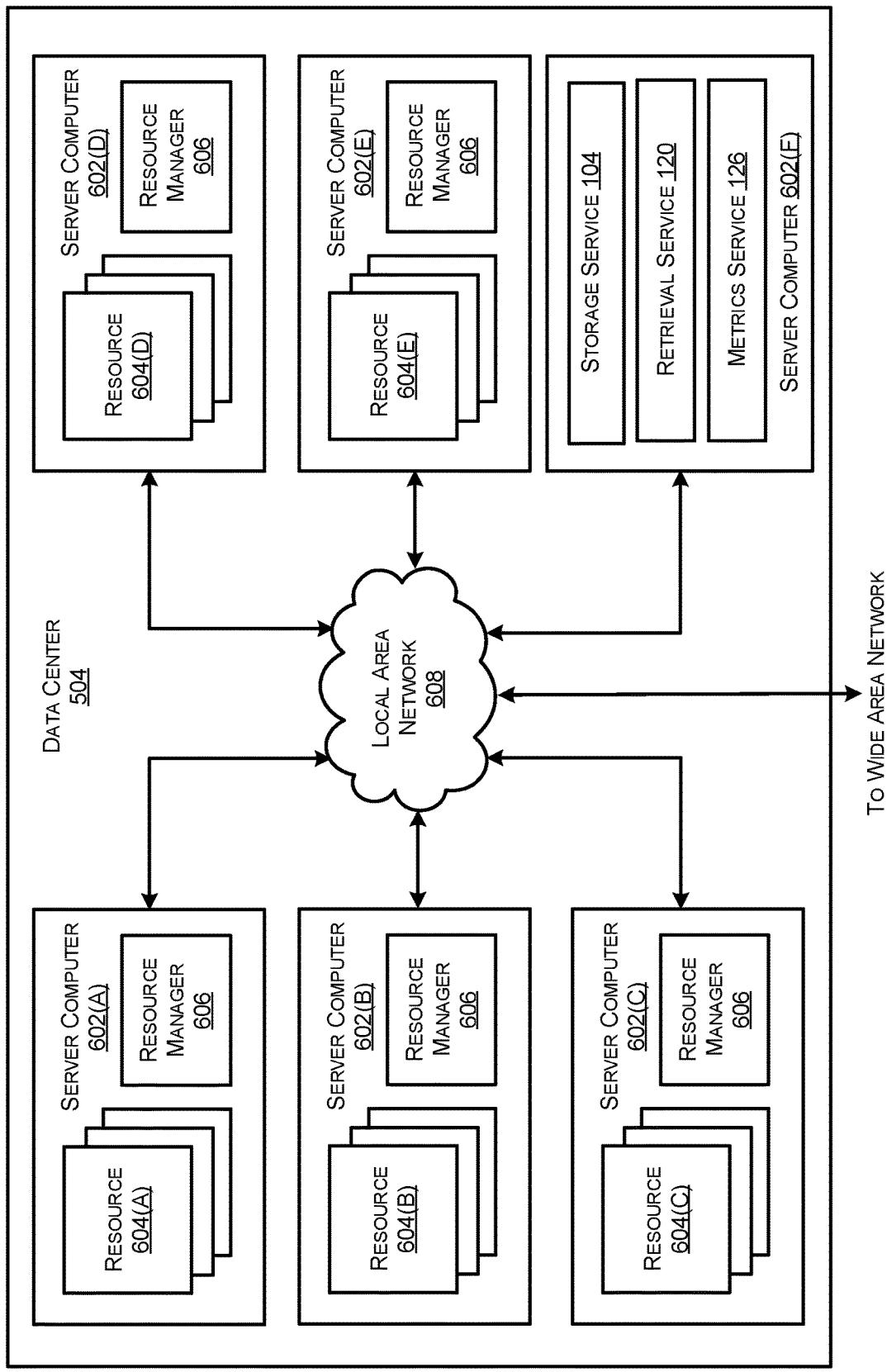
FIG. 6 is a computing system diagram illustrating a configuration for a data center that can be utilized to implement aspects of the technologies disclosed herein.

FIG. 6 is a computing system diagram that illustrates one configuration for a data center 504 that implements aspects of the technologies disclosed herein. The example data center 504 shown in FIG. 6 includes several server computers 602A-602F (which might be referred to herein singularly as "a server computer 602" or in the plural as "the server computers 602") for providing computing resources 604A-604E.

The server computers 602 can be standard tower, rackmount, or blade server computers configured appropriately for providing the computing resources described herein (illustrated in FIG. 6 as the computing resources 604A-604E). As mentioned above, the computing resources provided by the service provider network 102 can be data processing resources such as VM instances or hardware computing systems, database clusters, computing clusters, storage clusters, data storage resources, database resources, networking resources, and others. Some of the servers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single server computer 602. Server computers 602 in the data center 504 can also be configured to provide network services and other types of services, some of which are described in detail below with regard to FIG. 6.

The data center 504 shown in FIG. 6 also includes a server computer 602F that can execute some or all of the software components described above. For example, and without limitation, the server computer 602F can be configured to execute components of the service provider network 102, including writer nodes 106, the reader nodes 122, the metrics service and/or the other software components described above. The server computer 802F can also be configured to execute other components and/or to store data for providing some or all of the functionality described herein. In this regard, it should be appreciated that the services illustrated in FIG. 7 as executing on the server computer 602F can execute on many other physical or virtual servers in the data centers 504 in various embodiments.

In the example data center 504 shown in FIG. 6, an appropriate LAN 608 is also utilized to interconnect the server computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 504A-504N, between each of the server computers 602A-602F in each data center 504, and, potentially, between computing resources in each of the server computers 602. It should be appreciated that the configuration of the data center 504 described with reference to FIG. 6 is merely illustrative and that other implementations can be utilized.

Figure 7:
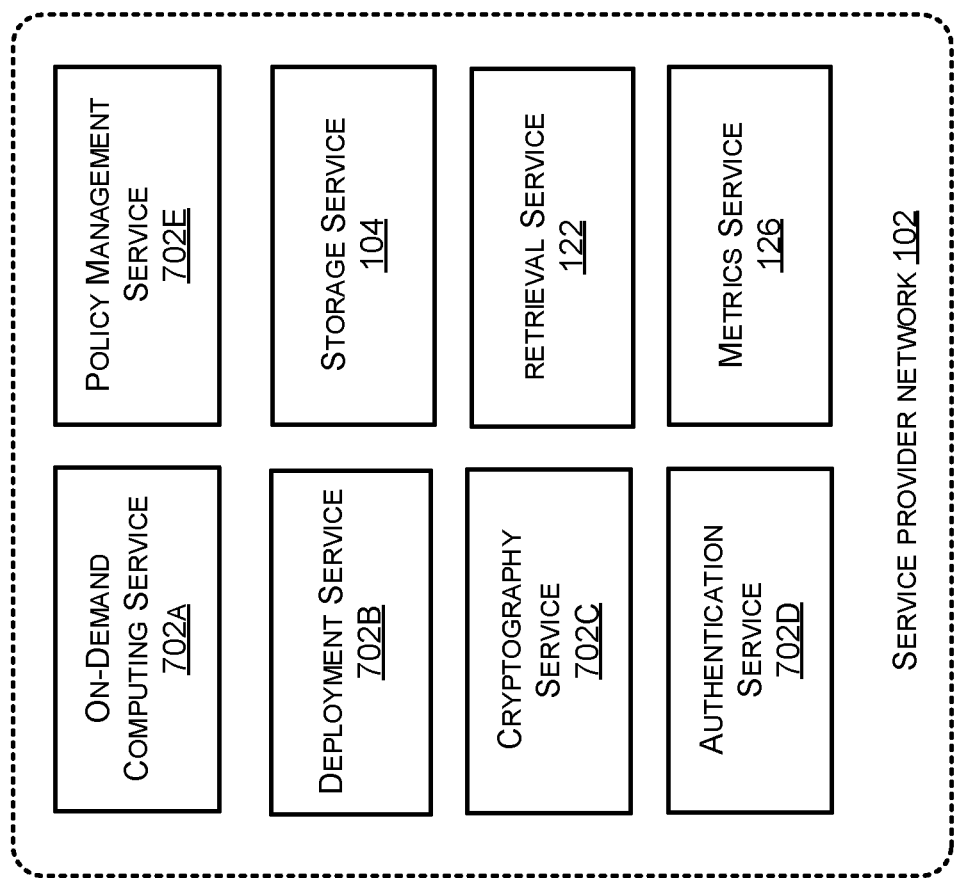
FIG. 7 is a network services diagram that shows aspects of several services that can be provided by and utilized within a system, or a larger system of which the system is a part, which is configured to implement the various technologies disclosed herein.

FIG. 7 is a system and network diagram that shows aspects of several network services that can be provided by and utilized within a service provider network 102 in one embodiment disclosed herein. In particular, and as discussed above, the service provider network 102 can provide a variety of network services to customers and other users of the service provider network 102 including, but not limited to, the storage service 104, the data store 118 and the retrieval service 120. The service provider network 102 can also provide other types of services including, but not limited to, an on-demand computing service 702A, a deployment service 902B, a cryptography service 702C, an authentication service 702D, and/or a policy management service 702E, some of which are described in greater detail below. Additionally, the service-provider network 102 can also provide other services, some of which are also described in greater detail below.

It should be appreciated that customers of the service provider network 102 can include organizations or individuals that utilize some or all of the services provided by the service provider network 102. As described herein, a customer or other user can communicate with the service provider network 102 through a network, such as the network 522 shown in FIG. 5. Communications from a customer computing device, such as the user device 112 shown in FIG. 5, to the service provider network 102 can cause the services provided by the service provider network 102 to operate in accordance with the described configurations or variations thereof.

It is noted that not all embodiments described include the services described with reference to FIG. 7 and that additional services can be provided in addition to or as an alternative to services explicitly described. Each of the services shown in FIG. 7 can also expose network services interfaces that enable a caller to submit appropriately configured API calls to the various services through web service requests. In addition, each of the services can include service interfaces that enable the services to access each other (e.g., to enable a virtual computer system provided by the on-demand computing service 702A to store data in or retrieve data from a storage service). Additional details regarding some of the services shown in FIG. 7 will now be provided.

As discussed above, the on-demand computing service 702A can be a collection of computing resources configured to instantiate VM instances and to provide other types of computing resources on demand. For example, a customer or other user of the service provider network 102 can interact with the on-demand computing service 702A (via appropriately configured and authenticated network services API calls) to provision and operate VM instances that are instantiated on physical computing devices hosted and operated by the service provider network 102.

The VM instances can be used for various purposes, such as to operate as servers supporting a web site, to operate business applications or, generally, to serve as computing resources for the customer. Other applications for the VM instances can be to support database applications such as those described herein, electronic commerce applications, business applications and/or other applications. Although the on-demand computing service 702A is shown in FIG. 7, any other computer system or computer system service can be utilized in the service provider network 102, such as a computer system or computer system service that does not employ virtualization and instead provisions computing resources on dedicated or shared computers/servers and/or other physical devices.

A storage service 702F (e.g., storage service 104) can include software and computing resources that collectively operate to store data using block or file-level storage devices (and/or virtualizations thereof) into data store 118, which may be part of the storage service 702F. The storage devices of the storage service 702F, e.g., writer nodes 106, can, for instance, be operationally attached to virtual computer systems provided by the on-demand computing service 702A to serve as logical units (e.g., virtual drives) for the computer systems. A storage device can also enable the persistent storage of data used/generated by a corresponding virtual computer system where the virtual computer system service might only provide ephemeral data storage.

The service provider network 102 can also include a cryptography service 702C. The cryptography service 702C can utilize storage services of the service provider network 102, such as the storage service 702F, to store encryption keys in encrypted form, whereby the keys are usable to decrypt customer keys accessible only to particular devices of the cryptography service 702C. The cryptography service 702C can also provide other types of functionality not specifically mentioned herein.

As illustrated in FIG. 7, the service provider network 102, in various embodiments, also includes an authentication service 702D and a policy management service 702E. The authentication service 702D, in one example, is a computer system (i.e., collection of computing resources) configured to perform operations involved in authentication of users. For instance, one of the services 702 shown in FIG. 7 can provide information from a user to the authentication service 702D to receive information in return that indicates whether or not the requests submitted by the user are authentic.

The policy management service 702E, in one example, is a network service configured to manage policies on behalf of customers or internal users of the service provider network 102. The policy management service 702E can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 102 can additionally maintain other services 702F based, at least in part, on the needs of its customers. For instance, the service provider network 102 can maintain a deployment service 702B for deploying program code and/or a data warehouse service in some embodiments. Other services include object-level archival data storage services, database services, and services that manage, monitor, interact with, or support other services. The service provider network 102 can also be configured with other services not specifically mentioned herein in other embodiments. The service provider network 102 can additionally maintain and provide services described herein, such as the metrics service 126. Functionality of these components are described above, and throughout.

Figure 8:
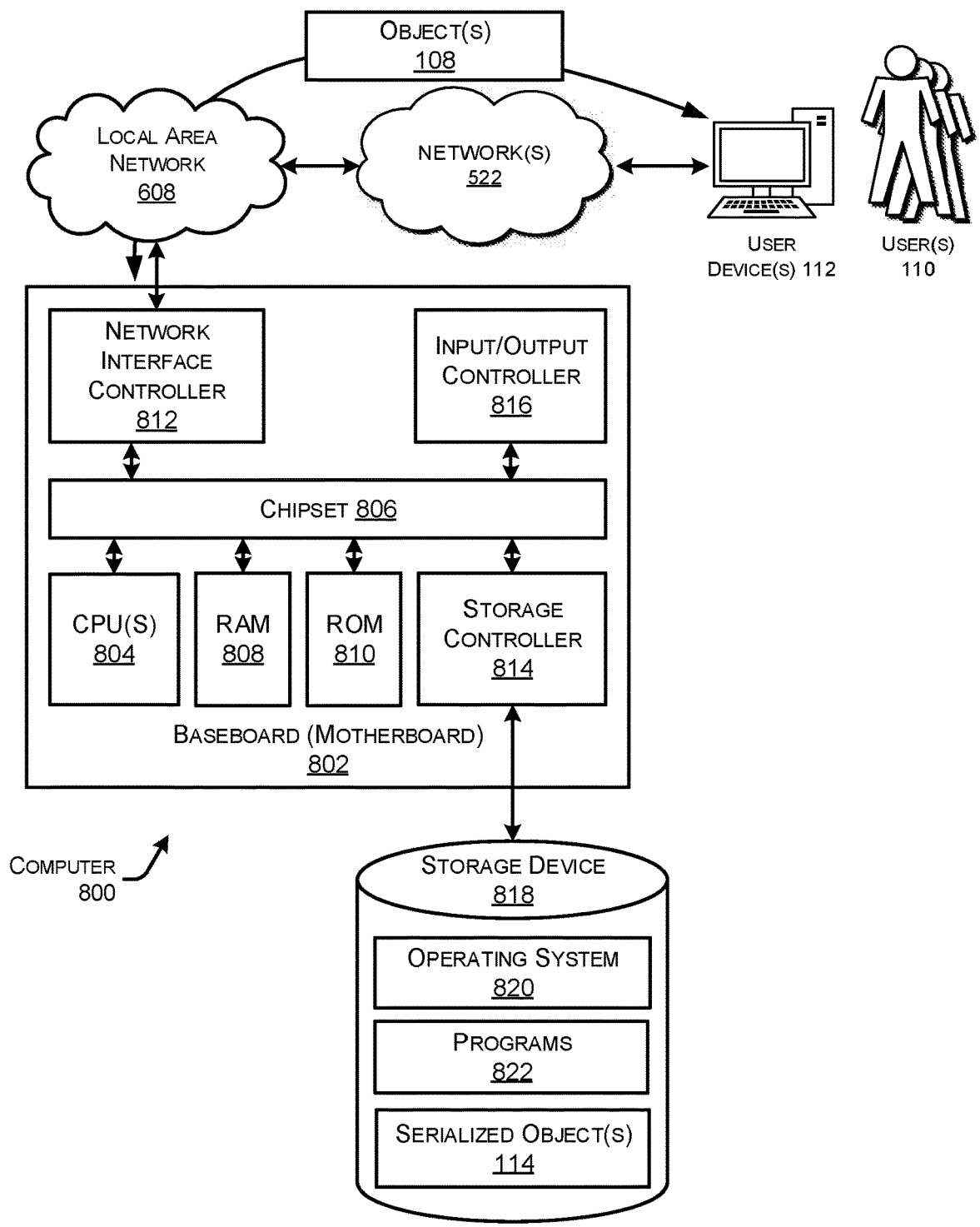
FIG. 8 is a computer architecture diagram showing an illustrative computer hardware architecture for implementing a computing device that can be utilized to implement aspects of the various technologies presented herein.

FIG. 8 shows an example computer architecture for a computer 800 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 608. The chipset 806 can include functionality for providing network connectivity through a NIC 812, such as a gigabit Ethernet adapter. The NIC 812 is capable of connecting the computer 800 to other computing devices over the network 608 (or 522). It should be appreciated that multiple NICs 812 can be present in the computer 800, connecting the computer to other types of networks and remote computer systems.

The computer 800 can be connected to a mass storage device 818 that provides non-volatile storage for the computer. The mass storage device 818 can store an operating system 820, programs 822 (e.g., agents, etc.), and data, applications(s), and/or serialized objects 114, which have been described in greater detail herein. The mass storage device 818 can be connected to the computer 800 through a storage controller 814 connected to the chipset 806. The mass storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the mass storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 818 is characterized as primary or secondary storage, and the like.

For example, the computer 800 can store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the mass storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by the service provider network 102, and or any components included therein, may be supported by one or more devices similar to computer 800. Stated otherwise, some or all of the operations performed by the service provider network 102, and or any components included therein, may be performed by one or more computer devices 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 818 can store other system or application programs and data utilized by the computer 800.

In one embodiment, the mass storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 1-4. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

As shown in FIG. 8, the computer 800 may transmit, receive, retrieve, or otherwise provide and/or obtain the objects 108 to and/or from the service provider network 102. The computer 800 may then store the objects 108 as serialized objects 114 on the operating system 820, and/or the programs 822 that are stored in the storage device 818 to update or otherwise modify the operating system 820 and/or the programs 822.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method comprising:
   reading, by a first reader node of multiple reader nodes, a first serialized object from a first data store;
   sending, by the first reader node and to a metrics service, first data indicating a highest serialization version that the first reader node supports;
   storing, by the metrics service, the first data in a second data store;
   determining, by the metrics service, a highest serialization version that each reader node of the multiple reader nodes supports;
   receiving, at a writer node, an object for storage at the first data store;
   sending, by the writer node and to the metrics service, a request for an indication of the highest serialization version that each reader node of the multiple reader nodes supports;
   receiving, by the writer node and from the metrics service, second data indicating the highest serialization version that each reader node of the multiple reader nodes supports;
   serializing, by the writer node, the object using the highest serialization version that each reader node of the multiple reader nodes supports to generate a second serialized object; and
   writing, by the writer node, the second serialized object to the first data store.

2. The computer-implemented method of claim 1, wherein the writer node is a first writer node, and wherein the method further comprises:
   receiving, at a second writer node, a second object for storage at the first data store;
   sending, by the second writer node and to the metrics service, a second request for a second indication of the highest serialization version that each reader node of the multiple reader nodes supports;
   receiving, by the second writer node and from the metrics service, third data indicating the highest serialization version that each reader node of the multiple reader nodes supports; and
   determining, by the second writer node, that the highest serialization version that each reader node of the multiple reader nodes supports is less than a serialization version associated with the second writer node.

3. The computer-implemented method of claim 2, further comprising refraining, by the second writer node, from serializing the second object using the serialization version associated with the second writer node based at least in part on determining that the highest serialization version that each reader node of the multiple reader nodes supports is less than the serialization version associated with the second writer node.

4. The computer-implemented method of claim 1 further comprising:
   determining that a second reader node of the multiple reader nodes has not read an object for a threshold amount of time;
   establishing a connection between a writer node and the second reader node; and
   sending, by the second reader node and to the metrics service, third data indicating a highest serialization version that the second reader node supports.

5. The computer-implemented method of claim 1, wherein the writer node is a first writer node, and wherein the method further comprises:
   determining that a second reader node of the multiple reader nodes has not read any objects for a threshold amount of time;
   establishing a first connection between a canary service and a second writer node;
   instructing, by the canary service, the second writer node to write a test object to a second data store;
   establishing a second connection between the canary service and the second reader node;
   instructing, by the canary service, the second reader node to read the test object from the second data store; and
   sending, by the second reader node, at least one of (i) second data indicating a highest version of a serialization version supported by the second reader node or (ii) an error indicating a failure to read the test object.

6. A system comprising one or more server computers hosting a service provider network configured to:
   read, by a first reader node of multiple reader nodes, a first serialized object from a first data store;
   send, by the first reader node and to a metrics service, first data indicating a highest serialization version that the first reader node supports;
   store, by the metrics service, the first data in a second data store;
   determine, by the metrics service, a highest serialization version that each reader node of the multiple reader nodes supports;
   receive, at a writer node, an object for storage at the first data store;
   send, by the writer node and to the metrics service, a request for an indication of the highest serialization version that each reader node of the multiple reader nodes supports;
   receive, by the writer node and from the metrics service, second data indicating the highest serialization version that each reader node of the multiple reader nodes supports;
   serialize, by the writer node, the object using the highest serialization version that each reader node of the multiple reader nodes supports to generate a second serialized object; and
   write, by the writer node, the second serialized object to the first data store.

7. The system of claim 6, wherein the writer node is a first writer node, and wherein the service provider network is further configured to:
   receive, at a second writer node, a second object for storage at the first data store;
   send, by the second writer node and to the metrics service, a second request for a second indication of the highest serialization version that each reader node of the multiple reader nodes supports;
   receive, by the second writer node and from the metrics service, third data indicating the highest serialization version that each reader node of the multiple reader nodes supports; and
   determine, by the second writer node, that the highest serialization version that each reader node of the multiple reader nodes supports is less than a serialization version associated with the second writer node.

8. The system of claim 7, wherein the service provider network is further configured to:
  refrain, by the second writer node, from serializing the second object using the serialization version associated with the second writer node based at least in part on determining that the highest serialization version that each reader node of the multiple reader nodes supports is less than the serialization version associated with the second writer node.

9. The system of claim 6 wherein the service provider network is further configured to:
  determine that a second reader node of the multiple reader nodes has not read an object for a threshold amount of time;
  establish a connection between a writer node and the second reader node; and
  send, by the second reader node and to the metrics service, third data indicating a highest serialization version that the second reader node supports.

10. The system of claim 6, wherein the writer node is a first writer node, and wherein the service provider network is further configured to:
  determine that a second reader node of the service provider network has not read any objects for a threshold amount of time;
  establishing a first connection between a canary service and a second writer node;
  instructing, by the canary service, the second writer node to write a test object to a second data store;
  establishing a second connection between the canary service and the second reader node;
  instructing, by the canary service, the second reader node to read the test object from the second data store; and
  sending, by the second reader node, at least one of (i) second data indicating a highest version of a serialization version supported by the second reader node or (ii) an error indicating a failure to read the test object.

11. One or more computer-readable media storing computer-executable instructions that, when executed, cause one or more processors to perform operations comprising:
  reading, by a first reader node of multiple reader nodes, a first serialized object from a first data store;
  sending, by the first reader node and to a metrics service, first data indicating a highest serialization version that the first reader node supports;
  storing, by the metrics service, the first data in a second data store;
  determining, by the metrics service, a highest serialization version that each reader node of the multiple reader nodes supports;
  receiving, at a writer node, an object for storage at the first data store;
  sending, by the writer node and to the metrics service, a request for an indication of the highest serialization version that each reader node of the multiple reader nodes supports;
  receiving, by the writer node and from the metrics service, second data indicating the highest serialization version that each reader node of the multiple reader nodes supports;
  serializing, by the writer node, the object using the highest serialization version that each reader node of the multiple reader nodes supports to generate a second serialized object; and
  writing, by the writer node, the second serialized object to the first data store.

12. The one or more computer-readable media of claim 11, wherein the writer node is a first writer node, and wherein the one or more computer-readable media further stores computer-executable instructions that, when executed, cause the one or more processors to perform operations comprising:
  receiving, at a second writer node, a second object for storage at the first data store;
  sending, by the second writer node and to the metrics service, a second request for a second indication of the highest serialization version that each reader node of the multiple reader nodes supports;
  receiving, by the second writer node and from the metrics service, third data indicating the highest serialization version that each reader node of the multiple reader nodes supports; and
  determining, by the second writer node, that the highest serialization version that each reader node of the multiple reader nodes supports is less than a serialization version associated with the second writer node.

13. The one or more computer-readable media of claim 12 further storing computer-executable instructions that, when executed, cause the one or more processors to perform operations comprising:
  refraining, by the second writer node, from serializing the second object using the serialization version associated with the second writer node based at least in part on determining that the highest serialization version that each reader node of the multiple reader nodes supports is less than the serialization version associated with the second writer node.

14. The one or more computer-readable media of claim 11 further storing computer-executable instructions that, when executed, cause the one or more processors to perform operations comprising:
  determining that a second reader node of the multiple reader nodes has not read an object for a threshold amount of time;
  establishing a connection between a writer node and the second reader node; and
  sending, by the second reader node and to the metrics service, third data indicating a highest serialization version that the second reader node supports.

15. The one or more computer-readable media of claim 11, wherein the writer node is a first writer node, and wherein the one or more computer-readable media further stores computer-executable instructions that, when executed, cause the one or more processors to perform operations comprising:
  determining that a second reader node of the multiple reader nodes has not read any objects for a threshold amount of time;
  establishing a first connection between a canary service and a second writer node;
  instructing, by the canary service, the second writer node to write a test object to a second data store;
  establishing a connection between the canary service and the second reader node;
  instructing, by the canary service, the second reader node to read the test object from the second data store; and
  sending, by the second reader node, at least one of (i) second data indicating a highest version of a serialization version supported by the second reader node or (ii) an error indicating a failure to read the test object.

* * * * *